United States Patent
Ando et al.

(10) Patent No.: US 12,296,777 B2
(45) Date of Patent: May 13, 2025

(54) VEHICLE OCCUPANT RESTRAINING SYSTEM COMPRISING A PASSENGER AIRBAG

(71) Applicants: ZF AUTOMOTIVE GERMANY GMBH, Alfdorf (DE); ZF AUTOMOTIVE JAPAN CO., LTD., Kanagawa (JP)

(72) Inventors: Naoki Ando, Tochigi (JP); Xu Yang, Kanagawa (JP); Ahmad Hafizi, Kanagawa (JP); Hidekazu Iida, Tokyo (JP); Harish Kumar Reddy Tummala, Kanagawa (JP)

(73) Assignees: ZF AUTOMOTIVE GERMANY GMBH, Alfdorf (DE); ZF AUTOMOTIVE JAPAN CO., LTD., Kanagawa (JP)

( * ) Notice: Subject to any disclaimer, the term of this patent is extended or adjusted under 35 U.S.C. 154(b) by 0 days.

(21) Appl. No.: 18/561,746

(22) PCT Filed: May 16, 2022

(86) PCT No.: PCT/EP2022/063179
§ 371 (c)(1),
(2) Date: Nov. 17, 2023

(87) PCT Pub. No.: WO2022/243240
PCT Pub. Date: Nov. 24, 2022

(65) Prior Publication Data
US 2024/0239294 A1    Jul. 18, 2024

(30) Foreign Application Priority Data
May 17, 2021 (DE) ..................... 10 2021 112 697.5

(51) Int. Cl.
*B60R 21/231* (2011.01)
*B60R 21/205* (2011.01)
(Continued)

(52) U.S. Cl.
CPC .......... *B60R 21/233* (2013.01); *B60R 21/205* (2013.01); *B60R 21/2338* (2013.01);
(Continued)

(58) Field of Classification Search
CPC ... B60R 21/231; B60R 21/233; B60R 21/239; B60R 21/205; B60R 2021/23308;
(Continued)

(56) References Cited

U.S. PATENT DOCUMENTS

| 6,254,121 | B1 * | 7/2001 | Fowler | .................. B60R 21/233 280/736 |
| 7,681,909 | B2 * | 3/2010 | Idomoto | ............. B60R 21/2346 280/736 |

(Continued)

FOREIGN PATENT DOCUMENTS

| EP | 0812741 B1 * | 12/2001 |
| JP | 2018158638 A * | 10/2018 |

(Continued)

OTHER PUBLICATIONS

PCT International Search Report for corresponding International Application Serial No. PCT/EP2022/063179, mailed Oct. 18, 2022, pp. 1-4.

*Primary Examiner* — Keith J Frisby
(74) *Attorney, Agent, or Firm* — Tarolli, Sundheim, Covell & Tummino LLP

(57) ABSTRACT

A vehicle occupant restraint system comprises a passenger airbag (10) which includes first and second inflatable chambers (24, 26), wherein the second chamber (26) is provided to cushion the head (28) of a vehicle occupant (14) associ- (Continued)

ated with the passenger airbag (10). In a state of the passenger airbag (10) fully filled and arranged in a vehicle, the first chamber (24) has a higher internal pressure than the second chamber (26). In a baffle (20) of the passenger airbag (10), when viewed along a vehicle longitudinal direction (L), the first chamber (24) has a V shape with two arms (34) and a tip (38), the second chamber (26) being disposed between the arms (34) of the V, and the tip (38) of the V facing downwards with respect to a vehicle vertical direction (H).

10 Claims, 4 Drawing Sheets

(51) Int. Cl.
  *B60R 21/233*  (2006.01)
  *B60R 21/2338*  (2011.01)
  *B60R 21/239*  (2006.01)
(52) U.S. Cl.
  CPC .. *B60R 21/239* (2013.01); *B60R 2021/23308* (2013.01); *B60R 2021/23324* (2013.01)
(58) Field of Classification Search
  CPC ........... B60R 2021/23316; B60R 2021/23324; B60R 2021/23332; B60R 2021/0009; B60R 2021/0004; B60R 2021/23107; B60R 2021/26094; B60R 2021/0044; B60R 2021/0048

USPC ...................... 280/729, 732, 743.1
See application file for complete search history.

(56) References Cited

U.S. PATENT DOCUMENTS

| | | | | |
|---|---|---|---|---|
| 9,731,674 | B2 * | 8/2017 | Jindal | ................... B60R 21/231 |
| 9,902,359 | B2 * | 2/2018 | Takeshita | ............ B60R 21/2338 |
| 10,183,645 | B2 | 1/2019 | Rose et al. | |
| 11,192,513 | B2 * | 12/2021 | Takeuchi | ............... B60R 21/205 |
| 2006/0186655 | A1 * | 8/2006 | Ehrke | ................. B60R 21/2346 |
| | | | | 280/743.1 |
| 2006/0197318 | A1 * | 9/2006 | Choi | .................... B60R 21/233 |
| | | | | 280/743.1 |
| 2006/0279072 | A1 * | 12/2006 | Hanawa | ................ B60R 21/233 |
| | | | | 280/743.1 |
| 2007/0200321 | A1 * | 8/2007 | Heitplatz | ............... B60R 21/206 |
| | | | | 280/740 |
| 2011/0001307 | A1 | 1/2011 | Mendez | |
| 2011/0175334 | A1 * | 7/2011 | Miller | ................... B60R 21/239 |
| | | | | 280/736 |
| 2012/0112441 | A1 | 5/2012 | Ohara | |
| 2018/0111581 | A1 | 4/2018 | Wang et al. | |
| 2018/0126946 | A1 | 5/2018 | Bausch et al. | |
| 2020/0223390 | A1 | 7/2020 | Munoz Melgar et al. | |
| 2020/0276953 | A1 * | 9/2020 | Enders | ................. B60R 21/233 |

FOREIGN PATENT DOCUMENTS

| | | | | |
|---|---|---|---|---|
| JP | | 2018167675 A | * 11/2018 | |
| WO | WO-2006082900 A1 | * 8/2006 | ........... B60R 21/233 |

* cited by examiner

VEHICLE OCCUPANT RESTRAINING SYSTEM COMPRISING A PASSENGER AIRBAG

RELATED APPLICATIONS

This application is a U.S. National Stage Application filed under 35 USC 371, claiming priority to Serial No. PCT/EP2022/063179, filed on 16 May 2022; which claims priority from German Patent Application DE 10 2021 112 697.5, filed 17 May 2021, the entireties of which are hereby incorporated herein by reference.

TECHNICAL FIELD

The invention relates to a vehicle occupant restraint system comprising a passenger airbag.

BACKGROUND

Airbags are well suited to cushion vehicle occupants and thus to protect them against injury when a vehicle collides with an obstacle. However, further endeavors are made to reduce even more in particular the load on the head of the occupant in the event of an oblique impact.

SUMMARY

It is the object of the invention to provide improved protection for the head of a passenger.

This object is achieved by a vehicle occupant restraint system comprising a passenger airbag having first and second inflatable chambers, wherein the second chamber is provided to cushion the head of a vehicle occupant associated with the passenger airbag. In a state of the passenger airbag completely filled and arranged in a vehicle, the first chamber has a higher internal pressure than the second chamber. In a baffle of the passenger airbag, the first chamber takes a V-shape with two arms and a tip when viewed along a vehicle longitudinal direction, wherein the second chamber is interposed between the arms of the V and the tip of the V faces downwards with respect to a vehicle vertical direction.

The V shape can at least largely prevent, specifically in the event of an oblique crash, the head from laterally evading and from being rotated. The head is centered to the second chamber by the arms of the V. The lower internal pressure causes the baffle to yield in the area of the second chamber so that the head can immerse into the second chamber. This helps minimize the load acting on the head of the vehicle occupant.

The first chamber is preferably arranged to offer an impact surface for the shoulders, the torso and, where necessary, the lower body of the vehicle occupant.

The internal pressure of the second chamber should be selected to be so low that the second chamber is yielding to allow immersion of the head. The internal pressure of the first chamber, on the other hand, should be selected to be so high that said chamber remains stiff and dimensionally stable while the vehicle occupant impacts on the passenger airbag.

The angle at which the arms of the V of the first chamber enclose the second chamber can be about 60° to 85°, for example, and is preferably less than 90°.

In general, the arms of the first chamber also serve as a cushioning surface and for stabilizing the shoulder area of the vehicle occupant, and they also offer protection against rotation of the shoulder area in the event of an oblique crash. Therefore, it is of advantage when, in the vehicle vertical direction, the arms reach into the shoulder area of the associated vehicle occupant.

The area of the passenger airbag which is formed by the tip of the V can be provided to cushion a torso and/or a lower body of the vehicle occupant. Accordingly, a certain protection can be obtained even for unbelted vehicle occupants.

The first chamber preferably has a larger volume than the second chamber, as it must both stabilize the passenger airbag and perform the major part of the cushioning. The filling volume of the first chamber may be about 1.5 to 4 times that of the second chamber, for example.

The baffle is preferably made of portions of an outer panel of the first and second chambers.

The portion of the outer wall of the second chamber of the baffle in a possible example is triangular to kite-shaped, with the tip of the triangle facing downwards and the lateral surfaces being adjacent to the inner face of the arms of the V of the first chamber so that a proper cushioning surface for the head is formed. In this example, apart from a V-shaped portion of the first chamber and a triangular or kite-shaped portion of the second chamber, preferably no further cut parts are provided on the baffle.

The height of the second chamber on the baffle may be about 30% to 80% of the total height of the baffle from the tip of the V along the vehicle vertical direction, while the height of the first chamber correspondingly accounts for about 70% to 20% of the total height.

To further improve the restraining effect for the head, in the fully filled state of the passenger airbag located in the vehicle the arms of the V of the first chamber can project along the vehicle longitudinal direction at least partially from the second chamber. In this way, the arms in the upper area form side panels which constitute a lateral delimitation and support the head and guide it toward the first chamber.

In an upper side of the passenger airbag adjacent to the baffle, the second chamber is surrounded, in a possible embodiment, on three sides by the first chamber. The second chamber can partly protrude from the first chamber in the vehicle vertical direction.

In a top view onto the passenger airbag, the portion of the second chamber of the upper side is triangular, for example, wherein a tip of the triangle faces the windscreen of the vehicle, and one side of the triangle is adjacent to the upper side of the triangular or kite-shaped portion of the second chamber of the baffle. In this case, the second chamber is surrounded on the upper side in U-shape by the first chamber, with the U being opened toward the vehicle occupant.

The widest point of the second chamber relative to a vehicle transverse direction is provided, for example, at the transition from the baffle to the upper side.

The filling gas for the passenger airbag is usually supplied, as is commonly known, by an inflator provided in the vehicle occupant restraint system. The inflator is preferably in direct fluid communication with the first chamber only. In this case, the second chamber is filled only indirectly via the first chamber and has no separate direct connection to an inflator. This permits to easily adjust a lower internal pressure for the second chamber than for the first chamber.

Between the first chamber and the second chamber, at least one valve may be disposed which permits exclusively gas flow from the first chamber into the second chamber and which forms the only fluid communication between the first chamber and the second chamber. Accordingly, the internal pressure of the second chamber can be easily controlled.

It is possible for the valve to constitute the only outflow opening from the first chamber so that the internal pressure of the first chamber can be maintained as long as possible at a high level.

The valve is specifically a non-return valve. It might also be conceivable to provide a closable or a permanently open overflow opening instead of the valve.

To allow gas to flow out of the second chamber, preferably at least one outlet opening is disposed in an outer wall of the second chamber.

Advantageously, this outlet opening is permanently open so that gas can flow out of the second chamber with little flow resistance and the internal pressure of the second chamber is maintained at a low level during the whole situation of restraint.

The internal pressure of the second chamber can be adjusted via the size and/or the number of the outlet openings.

The outlet opening is disposed on the upper side of the passenger airbag, for example.

The first and second chambers are separated from each other inside the passenger airbag preferably by an inner wall, wherein the first chamber is directly adjacent to the second chamber.

The valve is advantageously disposed in the inner wall.

The outer wall of the passenger airbag is formed by the outer faces of the first and second chambers, while the inner wall is located between the first and second chambers in the interior of the passenger airbag. The inner wall extends between the first and second chambers along the boundary to the baffle specifically the V-shape of the first chamber. Apart from a fluid separation of the first or second chamber, the inner wall can also assume the function of tethers for shaping and stabilizing the shape of the passenger airbag.

It is also possible to fix the inner wall additionally by tethers in the desired position.

The second chamber may be wedge-shaped or drop-shaped in the inflated state, with the major part of the second chamber being located inside the passenger airbag.

It is possible that only each of the baffle and the upper side includes a wall portion of the first and second chambers which is part of the outer panel of the passenger airbag.

The second chamber forms neither an independent further inflatable bag attached onto the airbag formed by the first chamber as a separate chamber, nor merely a fabric flap attached onto the outer panel of the first chamber.

In the inflated and installed state, according to a variant the second chamber projects with its portions defining the baffle from the portions of the baffle formed by the second chamber in the direction of the vehicle tail and, thus, opposite to the driving direction so that, in a top view, the baffle has a central indentation by the offset second chamber, causing the occupant to be additionally stabilized in the lateral direction.

Further, in the area of the baffle the second chamber can project upwards from the arms and can define, when viewed in the driving direction, an elevation at the airbag.

The first chamber forms a kind of base of the airbag from which the arms extend upwards. The second chamber which projects upwards from the arms is received between the arms.

BRIEF DESCRIPTION OF THE DRAWINGS

In the following, the invention shall be illustrated by way of an embodiment and with reference to the attached Figures, wherein.

The FIGS. 1 to 5 illustrate a passenger airbag 10 of a vehicle occupant restraint system 12.

DESCRIPTION

Figure 3:
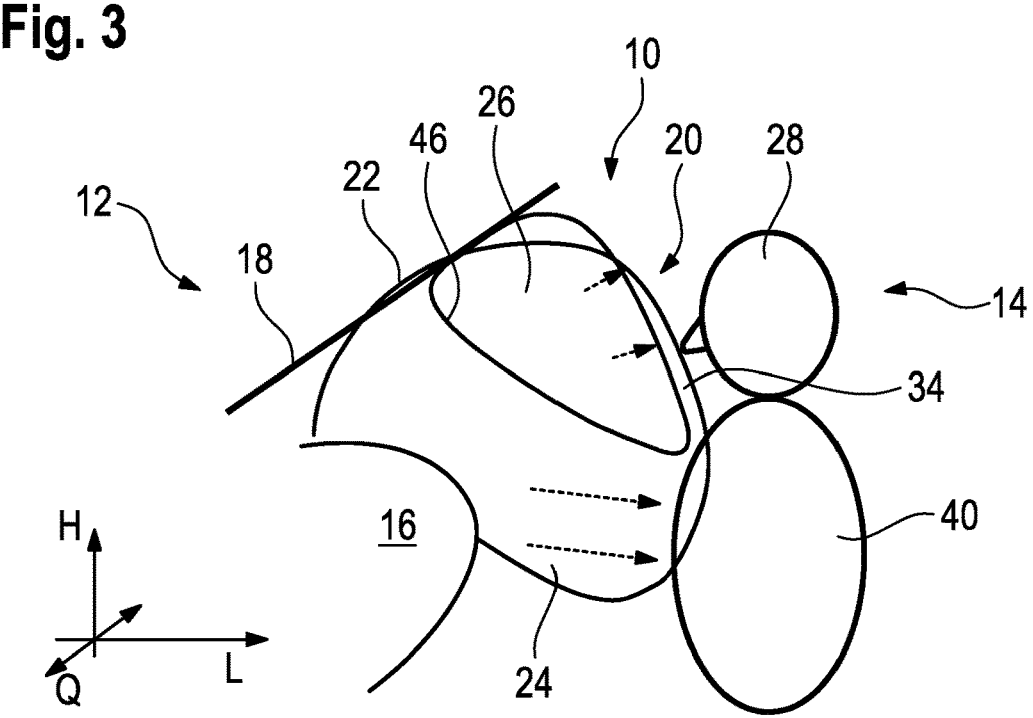
FIG. 3 shows a schematic side view of a vehicle occupant restraint system according to the invention including the passenger airbag of FIG. 1.

As disclosed in FIG. 3, the passenger airbag 10 is associated with a single vehicle occupant 14, in this case a front passenger, and, before its deployment, is accommodated in an instrument panel 16 of the (only schematically indicated) vehicle. In the fully filled state, the passenger airbag 10 is located along a vehicle longitudinal direction L between the instrument panel 16 and the vehicle occupant 14 and extends along a vehicle vertical direction H to a windscreen 18 of the vehicle to bear against the windscreen 18 and the instrument panel 16.

Figure 1:
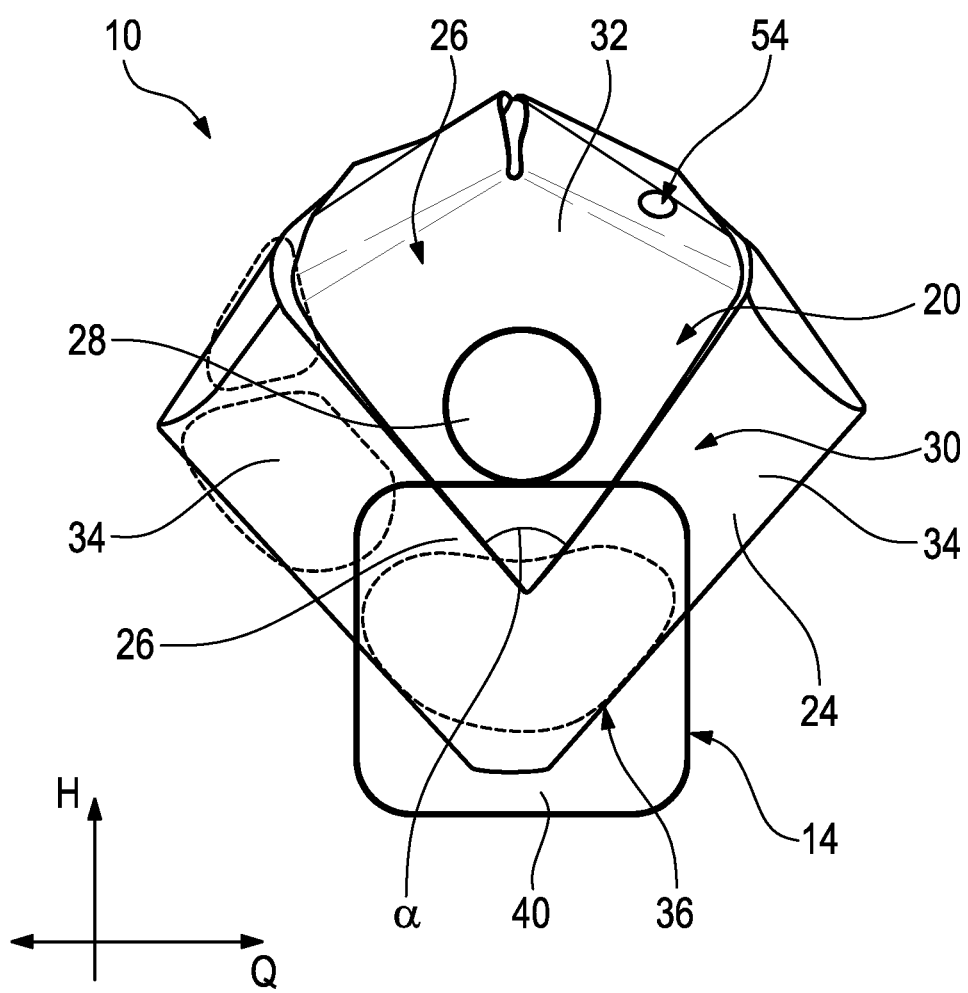
FIG. 1 shows a schematic perspective view of a fully filled passenger airbag of a vehicle occupant restraint system according to the invention in the position disposed in a vehicle.

FIG. 1 illustrates the inflated passenger airbag 10 in a view along the vehicle longitudinal direction L so that substantially a baffle 20 which serves to cushion the vehicle occupant 14 is visible.

Figure 2:
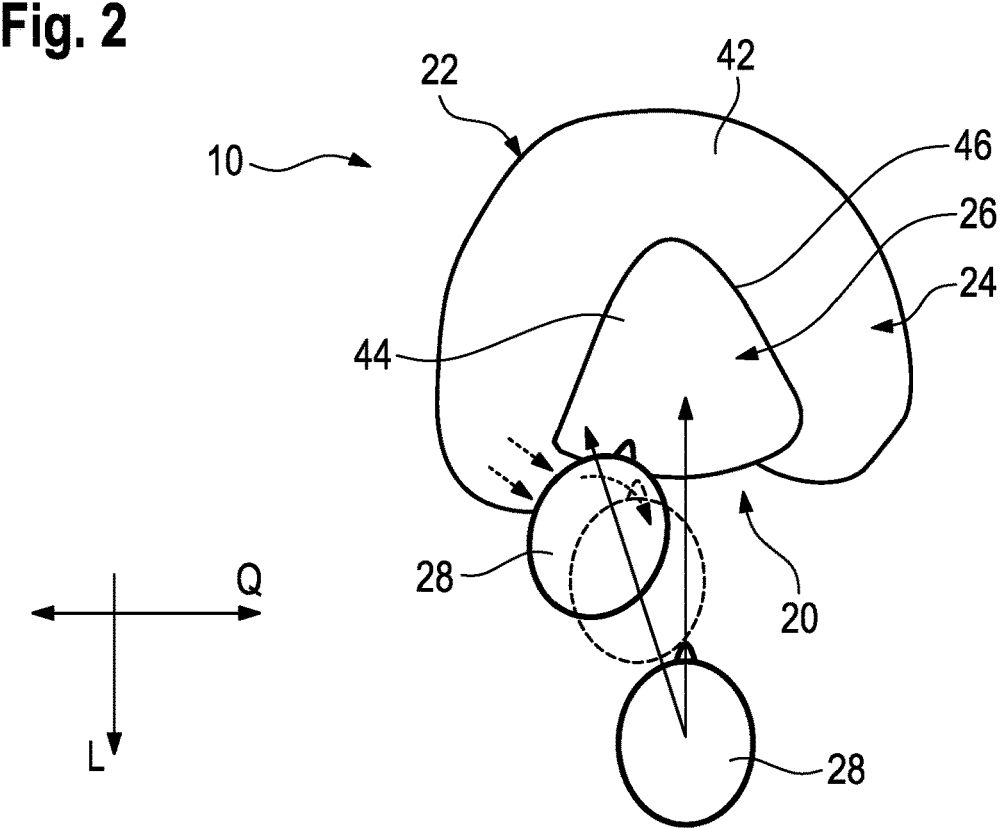
FIG. 2 shows the passenger airbag of FIG. 1 in a top view onto the upper side thereof.

FIG. 2 illustrates the passenger airbag 10 in a top view along the vehicle vertical direction H, wherein substantially an upper side 22 is shown.

Finally, FIG. 3 illustrates the passenger airbag 10 in a side view along a transverse direction Q of the vehicle. Here it is also evident that the baffle 20 faces the vehicle occupant 14 while the upper side 22 bears against the windscreen 18.

The whole inner volume of the passenger airbag 10 is formed by a first inflatable chamber 24 and a second inflatable chamber 26.

In the fully filled state, the internal pressure of the second chamber 26 is lower than that of the first chamber 24.

The second chamber 26 is arranged to cushion a head 28 of the vehicle occupant 14 when the latter immerses into the passenger airbag 10.

The baffle 20 is composed of an approximately V-shaped portion 30 of an outer panel of the first chamber 24 and an approximately triangular to kite-shaped portion 32 of an outer panel of the second chamber 26, as can be seen from FIG. 1.

The V-shaped portion 30 is disposed, with respect to the vehicle vertical direction H, below the portion 32, the portion 32 being located between the two arms 34 of the V.

The internal pressure in the first chamber 24 is selected to be so high that the passenger airbag 10 remains dimensionally stable when the vehicle occupant 14 immerses, wherein the arms 34 are arranged to support a shoulder area 36 of the vehicle occupant 14.

The two arms 34 converge into a tip 38 which, when the vehicle occupant 14 immerses, cushions the torso 40 and/or the lower body of the vehicle occupant (see FIG. 1).

The first chamber 24 forms a kind of base of the airbag 10 from which the plate-shaped arms 34 extend upwards.

Between the arms 34, the second chamber 26 which projects upwards from the arms 34 is received. As seen in a top view, the arms 34 converge toward the vehicle front and merge into each other in an arc shape (see FIG. 2).

In the area close to the occupant the arms extend inwardly around the lateral edges of the second chamber 26.

The internal pressure of the second chamber 26 is selected to be significantly lower so that the portion 32 yields when the head 28 impacts, and the head 28 can immerse into the baffle 20. The higher internal pressure of the arms 34 of the first chamber 24 stabilizes the passenger airbag 10.

In the example shown here, the upper ends of the arms 34 (relating to the vehicle vertical direction H) along the vehicle longitudinal direction L project a little from the portion 32, as is shown in FIGS. 2 and 3. Accordingly, the arms 34 develop an additional guiding effect upon the head 28 and delimit the sideways movement thereof and, even in the event of an oblique crash, guide it to the center of the portion 32 without any additional rotation. This is indicated in FIG. 2.

FIG. 2 illustrates that also the upper side 22 of the passenger airbag 10 is composed of a portion 42 of the outer panel of the first chamber 24 and a portion 44 of the outer panel of the second chamber 26, wherein the portion 44 is triangular and the portion 42 surrounds the portion 44 in U shape, with the open side of the U facing the vehicle occupant 14.

The side faces and the rear side of the passenger airbag 10 have no portions of the outer panel of the second chamber 26 in this case but are formed exclusively by portions of the outer panel of the first chamber 24.

In a whole, in this example the second chamber 26 is wedge-shaped or drop-shaped and so-to-speak protrudes from the upper side 22 into the passenger airbag 10. The outer panel of the passenger airbag 10 is composed exclusively of portions of the outer panel of the first chamber 24 and the outer panel of the second chamber 26. Further inflatable chambers are not provided in the passenger airbag 10 in this example.

As is illustrated in FIGS. 1 to 5, the second chamber 26 protrudes far into the interior of the passenger airbag 10.

For example, the height of the portion 32 of the second chamber 26 along the vehicle vertical direction H on the baffle 20 accounts for a share of 30 to 80% of the total height of the baffle 20.

The arms 34 of the first chamber 24 in this case enclose an angle α of less than 90°, such as between 60° and 85°.

In the area of the upper ends of the arms 34, the expansion of the portion 32 along the vehicle transverse direction Q is equal to or greater than the dimension of the two arms 34 together so that the portion 32 of the second chamber 26 is wider than the head 28 of the vehicle occupant 14.

The filling volume of the first chamber 24 is larger in this case than that of the second chamber 26.

The first chamber 24 and the second chamber 26 are directly connected or, in other words, are directly adjacent each other, in the interior of the passenger airbag 10 along an inner wall 46, wherein the inner wall 46 is configured to be gastight at least to a large extent.

Figure 4:
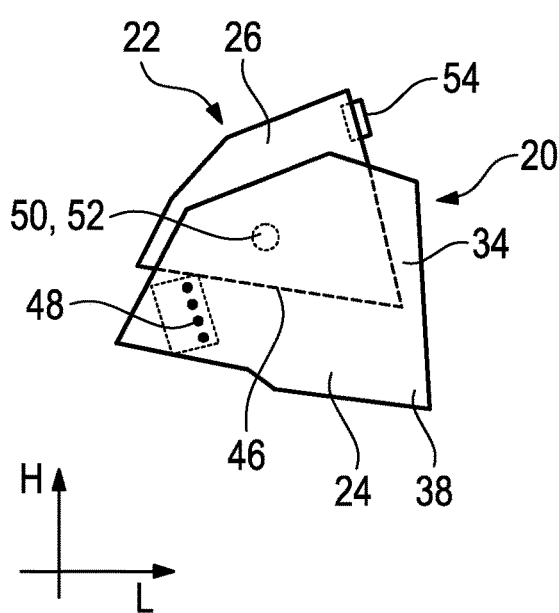
FIG. 4 shows a schematic side view of the passenger airbag of FIG. 1 in the fully filled state.
Figure 5:
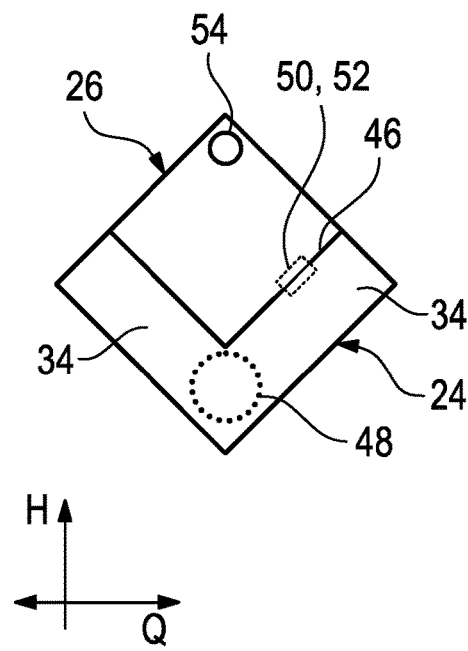
FIG. 5 shows a schematic top view onto the passenger airbag of FIG. 1 in the fully filled state.

The inner wall 46 extends along the boundary with the baffle 20 along the inner face of the arms 34 and on the upper side 22 along the inner face of the U (see FIG. 2) and from there extends downwards into the depth of the passenger airbag 10, as is evident in FIGS. 3 and 4.

For filling the passenger airbag 10, a conventional inflator 48 is provided which is in direct fluid communication with the first chamber 24 and is inserted in the latter here (see FIGS. 4 to 11).

The second chamber 26 is connected to the first chamber 24 exclusively by one or more overflow openings 50 in the inner wall 46, hence there is no direct fluid communication from the inflator 48 into the second chamber 26.

In this example, one single overflow opening 50 is provided in which a valve 52 (not shown in detail) allowing exclusively a gas flow from the first chamber 24 into the second chamber 26 is disposed. Here, the valve 52 is a non-return valve that prevents gas from returning into the first chamber 24.

In the outer wall of the second chamber 26, an outlet opening 54 through which gas can escape from the second chamber 26 is disposed. The outlet opening 54 is disposed at the transition from the baffle 20 to the upper side 22 and is permanently open in this example.

It is possible to provide only one or else more overflow openings 50 as well as only one or else more outlet openings 54.

The size, the number and the gas permeability of the overflow openings 50 and, resp., of the valve 52 as well as of the outlet openings 54 define the internal pressure adjusting in the second chamber 26 when the inflator 48 is activated.

Figure 6:
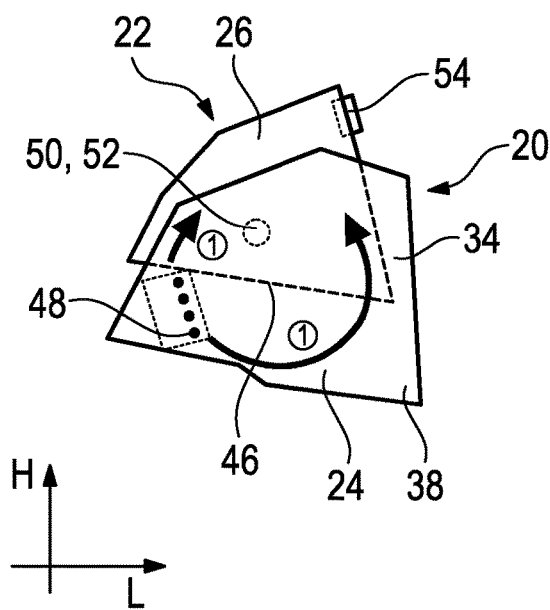
FIGS. 6 to 11 show the gas flow while the passenger airbag of FIG. 1 is filled.
Figure 7:
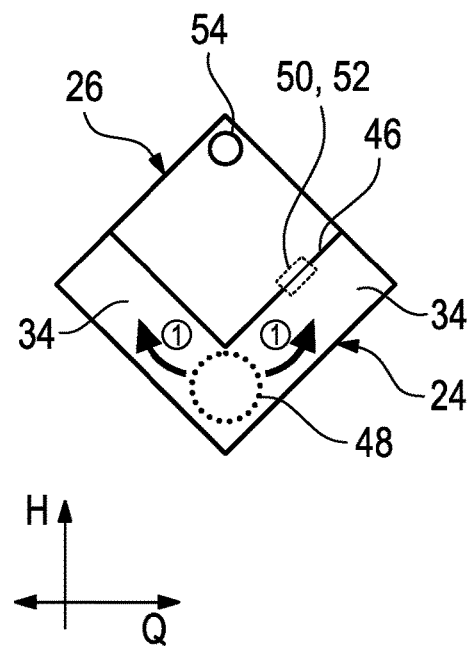
Figure 8:
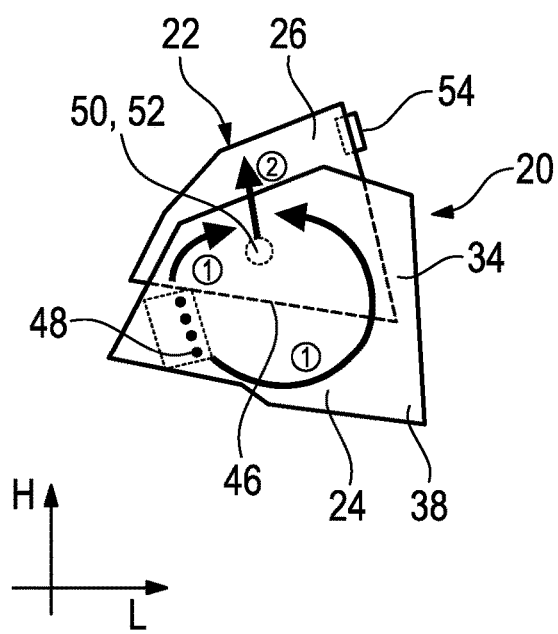
Figure 9:
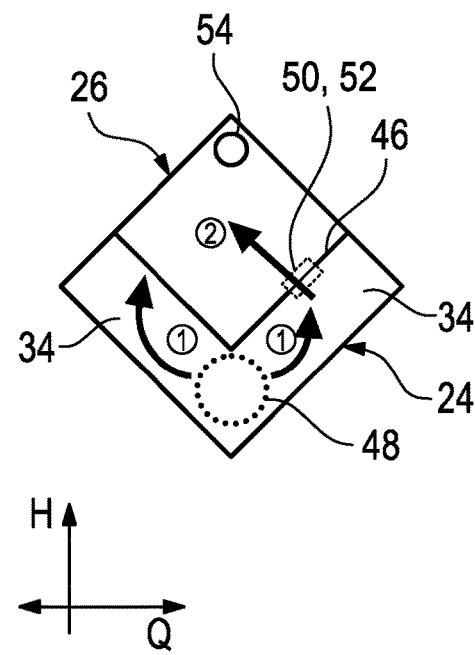

When the inflator 48 is activated, filling gas initially flows exclusively into the first chamber 26 as illustrated by the arrows 1 in FIGS. 6 and 7. From there the filling gas flows through the overflow opening 50 and the valve 52 into the second chamber 26 (see arrows 2 in FIGS. 8 and 9).

Figure 10:
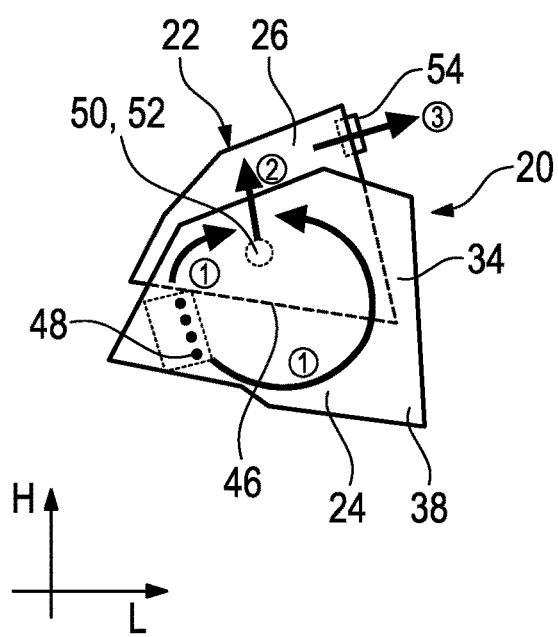
Figure 11:
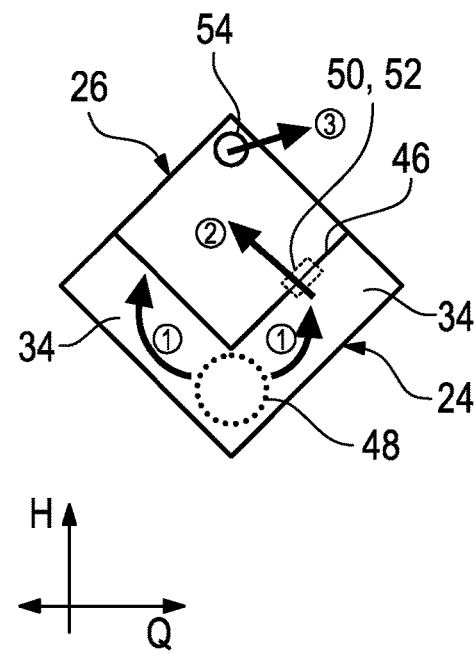

A part of the filling gas can escape from the second chamber 26 through the outlet opening 54 (see arrows 3 in FIGS. 10 and 11).

When the internal pressure in the second chamber 26 increases by the impact of the head 28, an additional amount of filling gas can flow off through the outlet opening 54 to keep the internal pressure low.

Due to the lower internal pressure in the second chamber 26 and the design of the first chamber 24, the vehicle occupant 14 can be cushioned even in the case of oblique impact so that his/her head 28 is subjected to very low torsional loads.

In the inflated and mounted state, according to the variant of FIG. 2, the first chamber 24 projects with its portions defining the baffle from the portions of the baffle formed by the second chamber 26 in the direction of the vehicle tail and, thus, opposite to the driving direction so that, in a top view, the baffle has a central indentation by the offset second chamber 26, which helps stabilize the occupant additionally in the lateral direction.

Furthermore, the second chamber 26 can project upwards from the arms in the area of the baffle (see FIG. 1) and define an elevation, when viewed in the driving direction, at the airbag.

The first chamber 24 forms a kind of base of the airbag from which the arms 34 extend upwards. The second chamber 26 which projects upwards from the arms 34 is received between the arms 34.

The invention claimed is:

1. A vehicle occupant restraint system comprising a passenger airbag which includes first and second inflatable chambers, wherein the second chamber is provided to cushion the head of a vehicle occupant associated with the passenger airbag, and in a state of the passenger airbag fully filled and arranged in a vehicle, the first chamber has a higher internal pressure than the second chamber, and in a baffle of the passenger airbag, when viewed along a vehicle longitudinal direction, the first chamber has a V-shape with two arms and a tip, wherein the second chamber is disposed between the arms of the V-shape, and the tip of the V-shape faces downwards with respect to a vehicle vertical direction.

2. The vehicle occupant restraint system according to claim 1, wherein the baffle is made of portions of an outer wall of the first and second chambers.

3. The vehicle occupant restraint system according to claim 2, wherein only the baffle and an upper side of the passenger airbag adjacent to the baffle include a respective portion of the first and second chambers which is part of the outer wall of the passenger airbag.

4. The vehicle occupant restraint system according to claim 1, wherein the area of the passenger airbag formed by the tip of the V-shape is configured and positioned to cushion a torso and/or lower body of the vehicle occupant.

5. The vehicle occupant restraint system according to claim 1, wherein, in the state of the passenger airbag fully filled and arranged in the vehicle, the arms of the V-shape of the first chamber project at least partially from the second chamber along the vehicle longitudinal direction.

6. The vehicle occupant restraint system according to claim 1, wherein in an upper side of the passenger airbag adjacent to the baffle the second chamber is surrounded by the first chamber at three sides.

7. The vehicle occupant restraint system according to claim 1, wherein there is provided an inflator which is in direct fluid communication with the first chamber only.

8. The vehicle occupant restraint system according to claim 7, wherein between the first and second chambers at least one valve is arranged which exclusively allows gas to flow from the first into the second chamber and which constitutes the only fluid communication between the first and second chambers.

9. The vehicle occupant restraint system according to claim 1, wherein at least one outlet opening is disposed in an outer wall of the second chamber.

10. The vehicle occupant restraint system according to claim 1, wherein the first and second chambers are separated from each other by an inner wall within the passenger airbag.

* * * * *